2,981,075
Patented Apr. 25, 1961

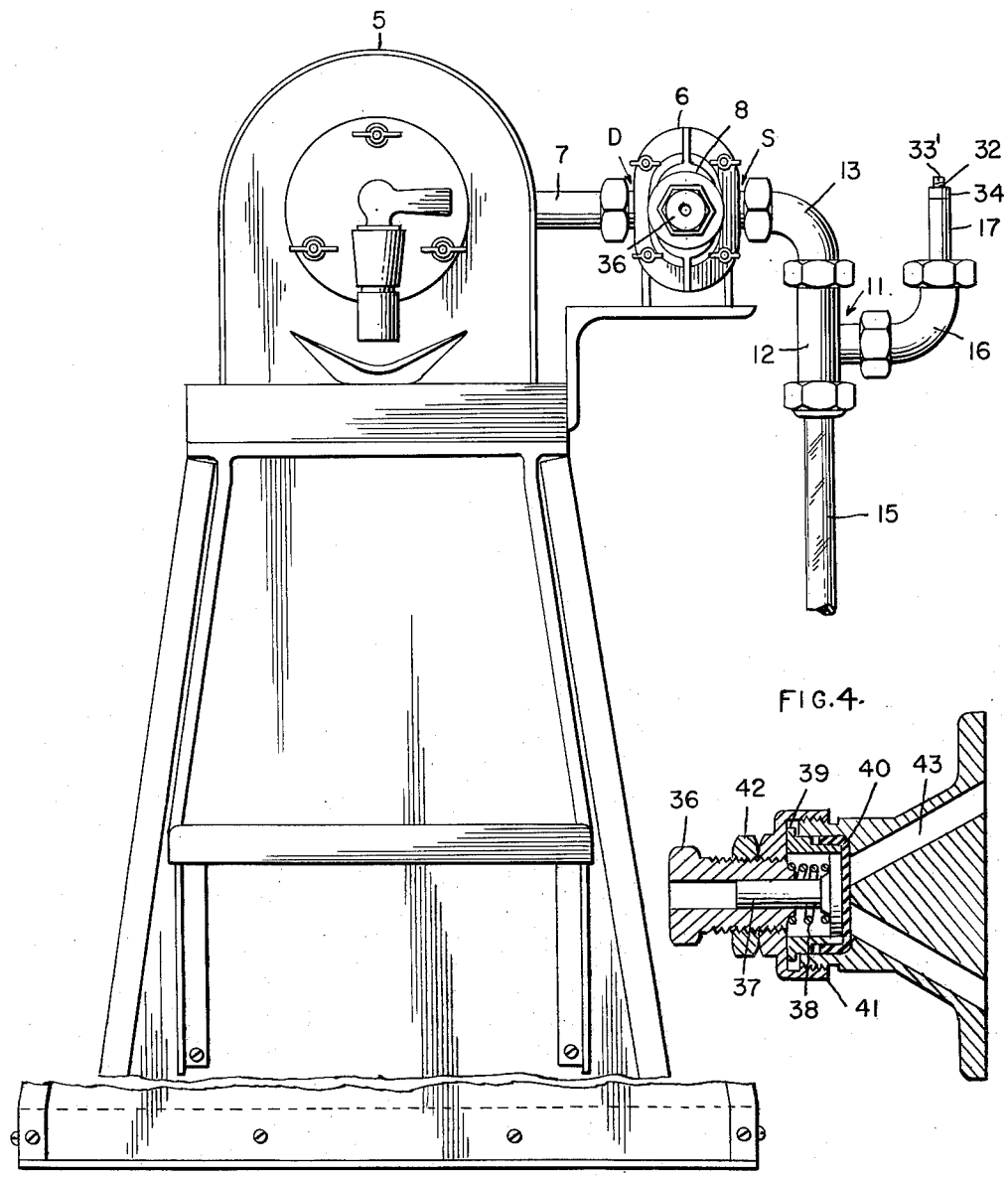

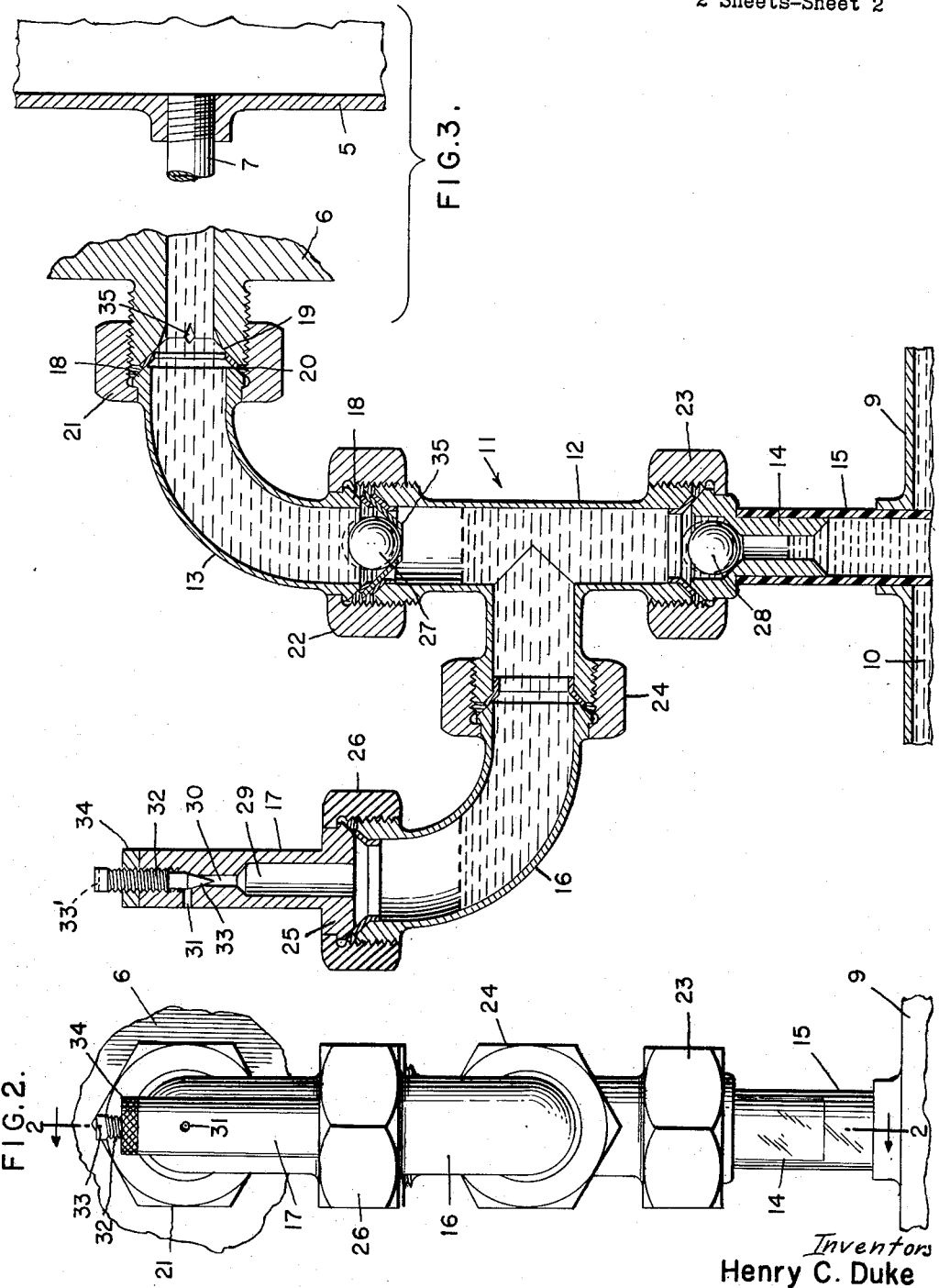

2,981,075
APPARATUS AND METHOD FOR MANUFACTURING SOFT ICE CREAM

Henry C. Duke and Gene S. Duke, both of 623 15th Ave., East Moline, Ill.

Filed June 17, 1954, Ser. No. 437,476

7 Claims. (Cl. 62—62)

This invention is an apparatus and method for use in the manufacture of soft ice cream and like confections.

After experiments over a period of years, we have found that the liquid mix may be automatically fed from the mix container to the freezing machine while the so-called overrun is accurately controlled and this constitutes an object of the present invention.

The term over-run as herein used is either the increase in volume of frozen mix over a specified volume of liquid mix, or the decrease in weight of the same volume of frozen mix as compared to liquid mix and it is another object of this invention to obtain a constant percentage of over-run. This percentage is obtained with our invention by automatically and accurately controlling the volume and rate of air that is permitted to enter the liquid mix suction line as the mix is being automatically pumped into the freezing machine.

Other objects of the invention will be manifest from the following description of the present preferred embodiment of the invention, taken in connection with the accompanying drawings, wherein:

Fig. 1 is an elevational view of apparatus used in carrying out the method of this invention;

Fig. 2 is a front elevational view of a suction assembly constructed in accordance with the present invention, illustrating its application;

Fig. 3 is a sectional view taken on line 2—2 of Fig. 2, looking in the direction of the arrows; and Fig. 4 is a sectional view of the vented pump cover.

For the purpose of illustrating the application of this invention, there is shown in the drawings, a freezing machine designated 5, which may be a conventional Dairy Queen machine, the freezing machine being connected to and in communication with a vented pump 6 through a conduit 7. The pump is of standard construction and includes an adjustable vented cover 8 detachably engaged with the front of the pump as shown in Fig. 1. There is also fragmentarily shown, a standard mix container 9 which is adapted for the reception of a liquid mix 10.

The pump 6 and mix container 9 are connected to and are in communication with a suction assembly generally designated 11. The assembly includes a T body 12, which, as shown in Fig. 3, is tubular. One terminal of the head of the T is connected to an elbow 13, the opposite end being connected to a ferrule 14 upon which is sleeved a transparent plastic tube 15 which extends into the mix container 9. The aft end of the T 12 is engaged with one end of an elbow 16, carrying a valve housing 17.

The opposite ends of the elbow 13 are bevelled as indicated at 18 and are adapted for mounting in complementally formed recesses. The upper bevelled end 18 is adapted to engage in a recess 19, lined with neoprene seal 20 or the like, the connection being effected by a nut 21 in the manner shown in Fig. 3 of the drawing. The lower end of the elbow 13 is connected to the upper end of the T head 12 in exactly the same manner as the upper end of the elbow is attached to the pump, the connection being made by a nut 22. The lower end of the T head 12 is connected to the top of the ferrule 14 by a nut 23 in a manner clearly illustrated in Fig. 3. The aft end of the T head is connected to the lower end of the elbow 16 by a nut 24 as also clearly shown in Fig. 3, while the upper end of the elbow 16 is connected to the lower end of a ring 25 carried by the bottom of the valve housing 17, by a nut 26. Upper and lower ball valves 27 and 28, respectively, are mounted at the junctures of the elbow 13 and T head 12 and the bottom of the T head and top of ferrule 14 as shown. The valve housing 17 is provided with a concentric orifice 29 which diminishes in diameter toward the top to provide a constricted passageway 30, the latter communicating with a vent 31 which extends radially through the wall of the housing as also clearly shown in Fig. 3. The constricted passageway 30, beginning at the vent 31 is enlarged and screw-threaded, adapted for the reception of a threaded needle 32, the lower end of which is pointed, as indicated at 33 and normally extends into the passageway 30. The outer end of the needle 32 is provided with a kerf 33' to facilitate its adjustment. The needle is held in a predetermined adjusted position by a knurled nut 34. To insure communication of the mix through the suction assembly 11 and into the pump 6, in the event of casual displacement of the ball valves 27 and 28 to their uppermost positions, notches 35 are provided in the inlet end of the pump 6 and in the lower end of the neoprene valve seat lining at the juncture of the lower end of the elbow 13 and upper end of. T head 12.

The vented pump cover 8 shown in detail in Fig. 4 is of standard construction and has been found to admirably adapt itself for use in carrying out the method of the present invention. This cover includes an adjusting screw 36 with a spring plunger 37 slidably mounted therein, the spring, designated 38, being mounted on the plunger and engaged with the inner end of the adjusting screw as shown in Fig. 4. A diaphragm bushing 39 is mounted in the open outer end of the cover and is equipped with a rubber diaphragm 40 which extends over the inner end of the bushing as shown to advantage in Fig. 4. The bushing and diaphragm are secured by a nut 41 which is threaded to the outer end of the cover 8. The adjusting screw 36 is threaded in the nut 41, as shown in the drawing, the adjusting screw being locked in any predetermined position by a lock nut 42. The cover 8 is provided with bypass channels 43 which converge at the diaphragm 40 and are in communication with the pump in a manner well known in the art.

In operation of this device, the pump 6 is started and the adjustment on the vented pump cover 8 is tightened slowly by turning the screw 36 until mix flows through the transparent plastic tube 15 and up through the suction side S of the pump and out the discharge side D into the freezing machine 5. This flow point automatically assures sufficient head pressure in the freezing chamber of the freezing machine 5, and the pump will automatically by-pass through the vented cover 8 as soon as the freezing chamber is full of mix. It will be noted, upon reference to Fig. 3, that the bore of the ferrule 14 is smaller than the bore of the pump inlet to, in effect, starve the pump, so that the suction created by the pump in starting, is present to a pronounced extent when the pump is drawing mix, which is a necessary condition for the automatic method. The ball valves 27 and 28 act as normal checks in an obvious manner. As soon as the liquid mix reaches the balls 28 and 27, they will, due to the action of suction and flow of the mix, rise to the position approximately as shown by the dotted lines in Fig. 3. If extreme suction would cause the balls to continue to rise, the notches 35 would prevent the balls from stopping the automatic flow of mix. Due to back pressure and gravity, the balls will return to their seats and the undue rise would not affect the automatic operation. The turbulence of the flowing mix passing up through the suction assembly 11 will allow air to enter the flow line with the mix, the percentage of air being controlled by the needle 32. When the pump starts and the mix begins to flow, air will enter through the vent 31, the metering of the air being effected by the adjustment of needle 32. The needle is secured in an adjusted position by the nut 34 as heretofore described.

When the freezing chamber is full and the pump starts to by-pass mix in the vented cover 8, the cylinder pressure is then transferred back to the suction line. This would force the mix back to supply receptacle 10, were it not for the intervention of ball 27 and ball 28 which return to and seat in their respective seats. As soon as the ball valve 27 is seated, ball 28 will also return to its seat and prevent, by reason of gravity, induced suction through the ferrule 14, and the liquid mix from returning through the plastic tube 15 into the supply receptacle. The amount of liquid that is trapped between the ball valves 27 and 28 will seek its own level approximately as shown in Fig. 3. Since there is neither flow nor turbulence in the trapped mix at this level, no amount of air will enter the mix line beyond the trapped mix. When the pump starts the automatic process of drawing mix, the entire cycle will be repeated.

It is of course to be understood that various changes may be made in this case within the scope of the appended claims.

What we claim is:

1. Apparatus for use in the manufacture of soft ice cream, comprising a freezing machine, a mix receptacle, a feed line connecting said freezing machine to said mix receptacle, a pump connected to said feed line for creating suction in the latter, said pump being provided with means for by-passing the mix and maintaining a predetermined pressure within the freezing machine, when the freezing machine is full, an air inlet line connected to said feed line between said pump and mix receptacle for drawing in air when the pump is operating, and check means in said feed line operatively connected with the pump and responsive to the direction in which mix flows through the feed line, said check means comprising spaced ball valves located above and below the air inlet line to seal off the air inlet line from the feed line when the mix is not being suctioned into the freezing machine, the upper ball valve being seated upon reversal of mix flow in the feed line to prevent the emission of mix through the air inlet line and the lower ball valve being seated under force of gravity and force created by mix trapped between the ball valves, to control overrun and to prevent the return of the mix to the mix receptacle.

2. A method for use in the manufacture of soft ice cream which comprises suctioning a liquid mix from a source of supply to a freezing station, automatically mixing a predetermined quantity of air with the mix during its travel from the source of supply to the freezing station, automatically diverting the mix to by-pass the freezing station when the latter is full, and automatically trapping that portion of the mix remaining between the source of supply and the freezing station, at the point of mixing air with the mix, to prevent the admission of air to mix located at the source of supply or at the freezing station.

3. Apparatus for manufacturing soft ice cream comprising a freezing machine, a mix receptacle and a pump operatively connected, said pump being normally adapted to suction the mix from the mix receptacle to the freezing machine, and a vented cover connected with said pump for diverting the mix from the freezing machine and maintaining a predetermined pressure within the latter, when the freezing machine is full.

4. Apparatus for manufacturing soft ice cream, comprising a freezing machine, a mix receptacle, a feed line connecting said freezing machine to said mix receptacle, a pump connected to said feed line for creating suction in the latter, said pump being provided with means for by-passing the mix and maintaining a predetermined pressure within the freezing machine, when the freezing machine is full, an air inlet line connected to said feed line between said pump and mix receptacle for drawing in air when the pump is operating, a check valve in said feed line operatively connected with the pump and responsive to the direction in which mix flows in the feed line to prevent a portion of the mix from returning to the mix receptacle, and a second check valve in the feed line in spaced relation to said first check valve, the check valves being strategically positioned and operative to seal off the air inlet line from the feed line when the mix is not being suctioned into the freezing machine.

5. Apparatus for manufacturing soft ice cream, comprising a freezing machine, a mix receptacle, a feed line connecting said freezing machine to said mix receptacle, a pump connected to said feed line for creating suction in the latter, said pump being provided with means for by-passing the mix and maintaining a predetermined pressure within the freezing machine, when the freezing machine is full, an air inlet line connected to said feed line between said pump and mix receptacle for drawing in air when the pump is operating, and a check valve in said feed line between said air inlet line and said pump responsive to the direction in which mix flows in the feed line to prevent a portion of the mix from returning to the mix receptacle.

6. A method for manufacturing soft ice cream which comprises suctioning a liquid mix from a source of supply through a mix aerating station to a freezing station, diverting the aerated mix to by-pass the freezing station, when the latter is full, automatically halting the suctioning of the mix from the source of supply when the mix is diverted, and trapping the aerated mix in the suction line between the aerating station and the freezing station, until the suctioning cycle is resumed.

7. A method for manufacturing soft ice cream as set out in claim 6, with the additional steps of trapping mix in the suction line at the aeration station and between the aeration station and the source of supply.

References Cited in the file of this patent

UNITED STATES PATENTS

| | | |
|---|---|---|
| 1,874,718 | Tyson | Aug. 30, 1932 |
| 2,054,835 | Routh | Sept. 22, 1936 |
| 2,067,683 | Routh | Jan. 12, 1937 |
| 2,210,366 | Godfrey | Aug. 6, 1940 |
| 2,211,387 | Routh | Aug. 13, 1940 |
| 2,219,656 | Miller | Oct. 29, 1940 |
| 2,278,340 | Weinrich | Mar. 31, 1942 |
| 2,560,664 | Sammy | July 17, 1951 |
| 2,563,278 | Rummel | Aug. 7, 1951 |
| 2,740,262 | Stalkup | Apr. 3, 1956 |